United States Patent
Rowe

(10) Patent No.: US 7,131,909 B2
(45) Date of Patent: Nov. 7, 2006

(54) METHOD AND APPARATUS FOR MANAGING GAMING MACHINE CODE DOWNLOADS

(75) Inventor: Rick Rowe, Henderson, NV (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 10/241,398

(22) Filed: Sep. 10, 2002

(65) Prior Publication Data

US 2004/0048667 A1    Mar. 11, 2004

(51) Int. Cl.
A63F 9/24    (2006.01)
(52) U.S. Cl. .............................. 463/42; 463/16; 463/20
(58) Field of Classification Search .................. 463/40, 463/42, 16, 20
See application file for complete search history.

(56) References Cited

U.S. PATENT DOCUMENTS

| | | | |
|---|---|---|---|
| 4,335,809 A | | 6/1982 | Wain |
| 4,856,787 A | * | 8/1989 | Itkis ........................... 273/237 |
| 5,136,644 A | | 8/1992 | Audebert et al. |
| 5,155,837 A | | 10/1992 | Liu et al. |
| 5,410,703 A | | 4/1995 | Nilsson et al. |
| 5,421,009 A | | 5/1995 | Platt |
| 5,421,017 A | | 5/1995 | Scholz et al. |
| 5,473,772 A | | 12/1995 | Halliwell et al. |
| 5,555,418 A | | 9/1996 | Nilsson et al. |
| 5,586,937 A | * | 12/1996 | Menashe ..................... 463/41 |
| 5,643,086 A | | 7/1997 | Alcorn et al. |
| 5,654,746 A | | 8/1997 | McMullan, Jr. et al. |
| 5,655,961 A | * | 8/1997 | Acres et al. ................... 463/27 |
| 5,682,533 A | | 10/1997 | Siljestroemer |
| 5,702,304 A | | 12/1997 | Acres et al. |
| 5,715,462 A | | 2/1998 | Iwamoto et al. |
| 5,741,183 A | | 4/1998 | Acres et al. |
| 5,752,882 A | | 5/1998 | Acres et al. |
| 5,759,102 A | | 6/1998 | Pease et al. |
| 5,762,552 A | | 6/1998 | Vuong et al. |
| 5,820,459 A | | 10/1998 | Acres et al. |
| 5,833,540 A | * | 11/1998 | Miodunski et al. ........... 463/42 |

(Continued)

FOREIGN PATENT DOCUMENTS

EP    0 689 325    6/1995

(Continued)

OTHER PUBLICATIONS

Hiroaki Higaki, 8 page document entitled "Group Communication Algorithm for Dynamically Updating in Distributed Systems" Copyright 1994 IEEE International Conference On Parallel and Distributed Systems (pp. 56-62) 08-8186-655-6/94, higaki@sdesun.slab.ntt.jp.

(Continued)

*Primary Examiner*—Corbett B. Coburn
(74) *Attorney, Agent, or Firm*—Beyer Weaver & Thomas LLP

(57) ABSTRACT

A gaming machine is arranged with a gaming machine controller and a secondary "queuing" device, preferably a player tracking controller having a memory. A communication link is provided between the player tracking controller and gaming machine controller, and the player tracking controller and a player tracking network including a player tracking host or server. A game code server is connected to the player tracking network. In accordance with a method, gaming machine code or data, such as game or other control code, is transmitted from the game code server over the player tracking network to the player tracking controller. The code may be processed by the player tracking controller, including by storing it in the player tracking controller memory. The code may then be transmitted to the gaming machine controller for storage and execution.

28 Claims, 3 Drawing Sheets

U.S. PATENT DOCUMENTS

| | | | |
|---|---|---|---|
| 5,836,817 A | 11/1998 | Acres et al. | |
| 5,845,077 A | 12/1998 | Fawcett | |
| 5,845,090 A | 12/1998 | Collins et al. | |
| 5,848,064 A | 12/1998 | Cowan | |
| 5,851,149 A * | 12/1998 | Xidos et al. | 463/42 |
| 5,870,723 A | 2/1999 | Pare, Jr. et al. | |
| 5,885,158 A * | 3/1999 | Torango et al. | 463/27 |
| 5,896,566 A | 4/1999 | Averbuch et al. | |
| 5,905,523 A | 5/1999 | Woodfield et al. | |
| 5,970,143 A | 10/1999 | Schneier | |
| 5,971,849 A * | 10/1999 | Falciglia | 463/16 |
| 5,980,384 A | 11/1999 | Barrie | |
| 6,006,034 A | 12/1999 | Heath et al. | |
| 6,029,046 A | 2/2000 | Khan et al. | |
| 6,047,128 A | 4/2000 | Zander | |
| 6,104,815 A | 8/2000 | Alcorn et al. | |
| 6,135,887 A | 10/2000 | Pease et al. | |
| 6,154,878 A | 11/2000 | Saboff | |
| 6,162,122 A | 12/2000 | Acres et al. | |
| 6,264,561 B1 | 7/2001 | Saffari et al. | |
| 6,317,827 B1 | 11/2001 | Cooper | |
| 6,319,125 B1 | 11/2001 | Acres | |
| 6,364,768 B1 | 4/2002 | Acres et al. | |
| 6,409,602 B1 * | 6/2002 | Wiltshire et al. | 463/42 |
| 6,645,077 B1 | 11/2003 | Rowe | |
| 2002/0137217 A1 | 9/2002 | Rowe | |
| 2003/0064771 A1 | 4/2003 | Morrow et al. | |
| 2003/0188306 A1 | 10/2003 | Harris et al. | |

FOREIGN PATENT DOCUMENTS

| | | |
|---|---|---|
| EP | 0 706 275 | 4/1996 |
| EP | 0841 615 | 5/1998 |
| EP | 0 905 614 | 3/1999 |
| EP | 1 004 970 | 5/2000 |
| GB | 2 151 054 | 7/1985 |
| GB | 2151054 | 7/1985 |
| WO | WO 01/20424 A2 | 3/2001 |
| WO | WO03/019486 | 3/2003 |

OTHER PUBLICATIONS

Steffen Hauptmann, et al., 12 page document entitled "On-line Maintenance With On-The-Fly Software Replacement" Copyright 1996 IEEE Proceedings, Third International Conference On Configurable Distributed Systems, (pp. 70-80) 0-8186-7395-8/96.

Hiroaki Higaki, 9 page document entitled "Extended Group Communication Algorithm For Updating Distributed Programs" Copyright 1996, IEEE, International Conference ON Parallel and Distributed Systems, 0-8186-7267-6/96, hig@takilab.k.dendai.as.jp.

* cited by examiner

METHOD AND APPARATUS FOR MANAGING GAMING MACHINE CODE DOWNLOADS

FIELD OF THE INVENTION

The present invention relates to a system and method for managing the download of gaming machine data, such as game code and other gaming machine control code.

BACKGROUND OF THE INVENTION

Today's gaming devices such as electronically controlled slot, video and similar machines generally include a central controller including a processor and a memory. The central controller controls the gaming machine, including the presentation of one or more games to a player at the gaming machine.

The processor of the gaming controller executes code to control the operation of the gaming machine. This code is stored at the memory of the gaming controller. Generally, the control code, including specific game code, is loaded into the memory when the gaming machine is manufactured.

There are a variety of circumstances which may arise when it is desirable to change the control and/or game code associated with the gaming machine controller. For example, the operator may wish to change the "paytable" so that the gaming machine returns a higher percentage of bets wagered. The operator may also wish to update an older game with a newer, more desirable one. Currently, this requires that a technician travel to the gaming machine, take the gaming machine out of service, and load new code. The new code may be loaded by replacing a static memory chip or in the case of a rewriteable memory, by overwriting older code.

There are numerous disadvantages with this arrangement, including that the arrangement takes the machine out of service and requires substantial manpower to accomplish, all reducing the profit which may be yielded by the machine. The present invention is directed at a practical manner for implementing downloads of gaming and other code, including managing the downloads without interruption to the gaming machine.

SUMMARY OF THE INVENTION

A gaming machine code download system and a method of managing or controlling the download of code to a gaming machine are disclosed.

One embodiment of the invention comprises a method of downloading code, information or data to a gaming machine from a remote device. In one embodiment, the method includes the step of storing gaming machine code at the remote device. A request for gaming machine code is generated, and the request is provided to the remote device. In accordance with one embodiment of the method, the gaming machine code is transmitted from the remote device to a first device of the gaming machine over a communication link in response to the request. The game code is processed, and all or a portion of the processed gaming code is provided to a gaming machine controller or other second device of the gaming machine for use.

In one embodiment, the method is implemented in an environment including a gaming machine, a communication network and at least one remote device. The gaming machine includes at least one gaming controller adapted to control the gaming machine, including for the purpose of presenting a game at the gaming machine. The gaming machine controller preferably includes a processor and a memory.

The gaming machine also includes a secondary device. The secondary device preferably comprises a player tracking controller. The player tracking controller includes a processor and a memory. One or more devices may be associated with the player tracking controller, such as a player tracking card reader and keypad.

In one embodiment, the player tracking controller includes a communication interface. The communication interface is associated with at least one network. In one embodiment, the network is a player tracking network including a player tracking host. The player tracking host includes a memory for storing player information, including information regarding a player's play at one or more gaming machines.

In a preferred embodiment, a game code host is associated with the player tracking network. Game code is transferred from the game code host to the gaming machine via the player tracking network. Transmitted game code is preferably directed to the player tracking controller of a gaming machine, which processes the code and transmits it to the gaming machine controller.

A variety of alternate systems or configurations of apparatus are contemplated for effectuating the methods of the invention. In one embodiment of a method, a request for gaming code is generated at the gaming machine and is transmitted to the game code host. The request may be generated by the gaming machine controller or player tracking controller/device. For example, in one embodiment, a request may be generated by the player tracking controller in response to the identification of a player by use of a player tracking card at a card reader of the player tracking device of the gaming machine.

Gaming code is transmitted from the game code host to the player tracking controller via the network or other communication link. In one embodiment, this link is part of a player tracking network which associates the player tracking device of the gaming machine with a player tracking host. In another embodiment, the link is a separate link from a link connecting the player tracking device of the gaming machine with the player tracking host, such as a wireless communication link to the game code host. The player tracking controller may process the gaming code in a variety of manners, including by storing all or a portion of the gaming code.

In one embodiment, a request for code is accompanied by information regarding the priority of the request. The method may include the step of queuing the code and transmitting it to the gaming machine at one or more particular times.

The gaming code may comprise a variety of information in a variety of forms. For example, the gaming code may comprise information used by the gaming machine controller for controlling or operating one or more peripheral devices of the gaming machine, such as a bill validator. The gaming code may also comprise a set of code permitting the gaming machine controller to present a particular game or games to a player.

Further objects, features, and advantages of the present invention over the prior art will become apparent from the detailed description of the drawings which follows, when considered with the attached figures.

DETAILED DESCRIPTION OF THE INVENTION

The invention is a method and system for managing or controlling the download of code or data to a gaming machine. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In general, the present invention comprises a method and apparatus for managing the download of gaming machine control code, game code or other data or information from a remote location for use by the gaming machine. In one embodiment, a gaming machine is configured to include a gaming controller and a secondary device, the secondary device is in communication with a remotely located device such as a server. The secondary device is arranged to accept and store code, as well as provide the code to the gaming controller.

Figure 1:
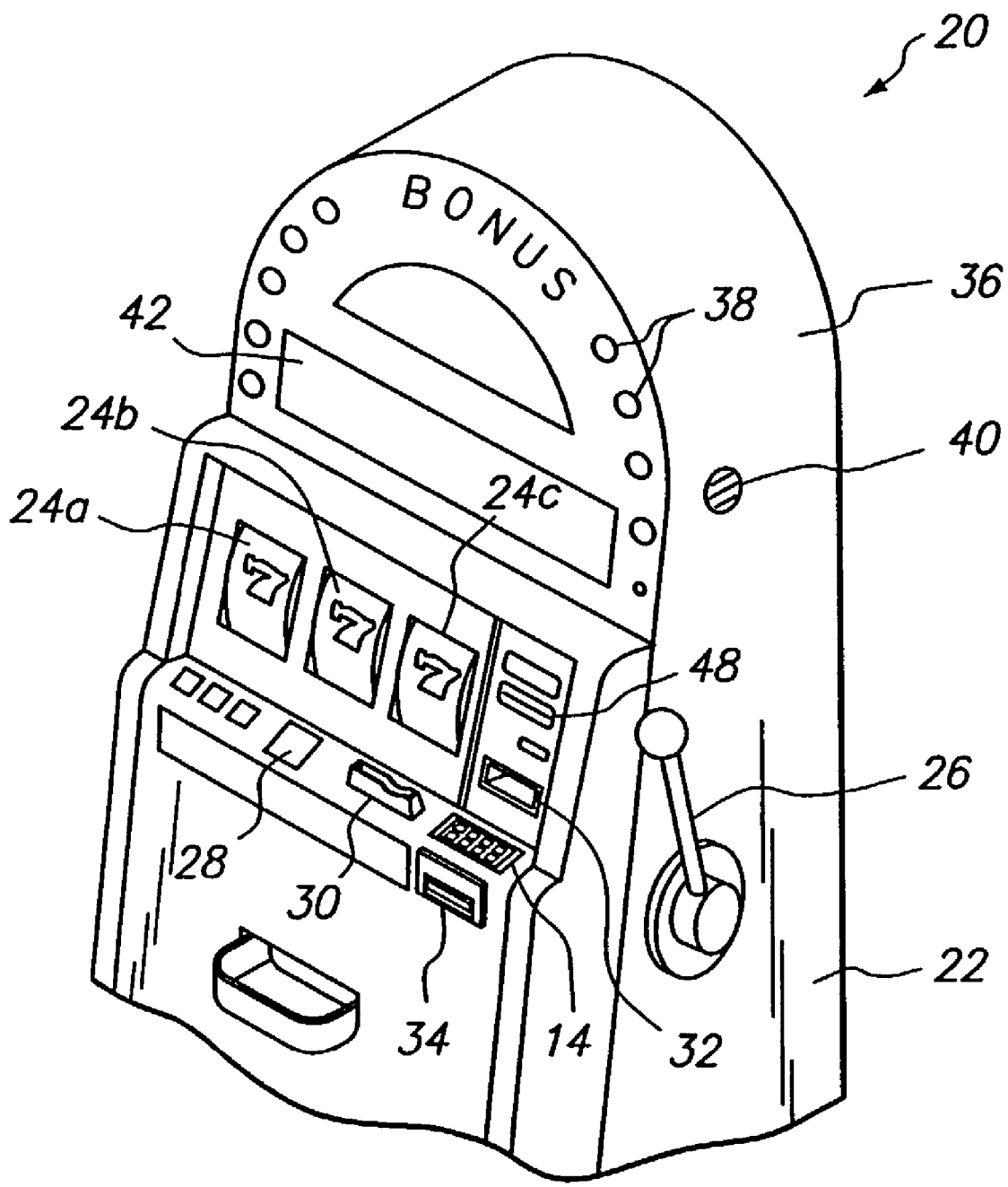
FIG. 1 is a perspective view of a portion of a gaming machine of a type to which the method and apparatus of the invention is applicable.

In one or more embodiments of the method and apparatus there is provided a gaming system including at least one gaming machine or device. FIG. 1 illustrates one embodiment of such a gaming machine 20. In general, the gaming machine 20 is adapted to present at least one game for play to a player. As illustrated, the gaming machine 20 includes a housing 22 which supports and/or houses the various components of the gaming machine 20. In the embodiment illustrated, the gaming machine 20 is adapted to present a game of "slots," and includes three rotating reels 24a,b,c. A handle 26 or spin button 28 may be used to effectuate rotation of the reels 24a,b,c.

In this well known game, a player may be declared a winner of the game and awarded an award if the result of the rotation of the reels 24a,b,c is a predetermined combination of symbols. It should be understood that the gaming machine 20 may be adapted to present one or more of a wide variety of games. Depending upon the game presented, the configuration of the machine may vary. For example, in the event the gaming machine 20 is adapted to present the game of video poker, then the gaming machine 20 may include a video display.

In one or more embodiments of the invention, the gaming machine 20 is adapted to present a wager-type game. In this arrangement, a player is required to place a bet or wager in order to participate in the game. In the event the outcome of the game is a winning outcome, then the player may be provided with an award such as coins or currency, or credits which may be redeemed for prizes or money. In one arrangement, the award may be winnings in proportion to the amount wagered or bet by the player.

In order to accept a wager, the gaming machine 20 may include a coin acceptor 30 for accepting coins. The gaming machine 20 may also include a bill acceptor or validator 32 for accepting paper currency. The gaming machine 20 may be provided with other means for accepting or verifying value, such as a credit card reader.

Figure 2:
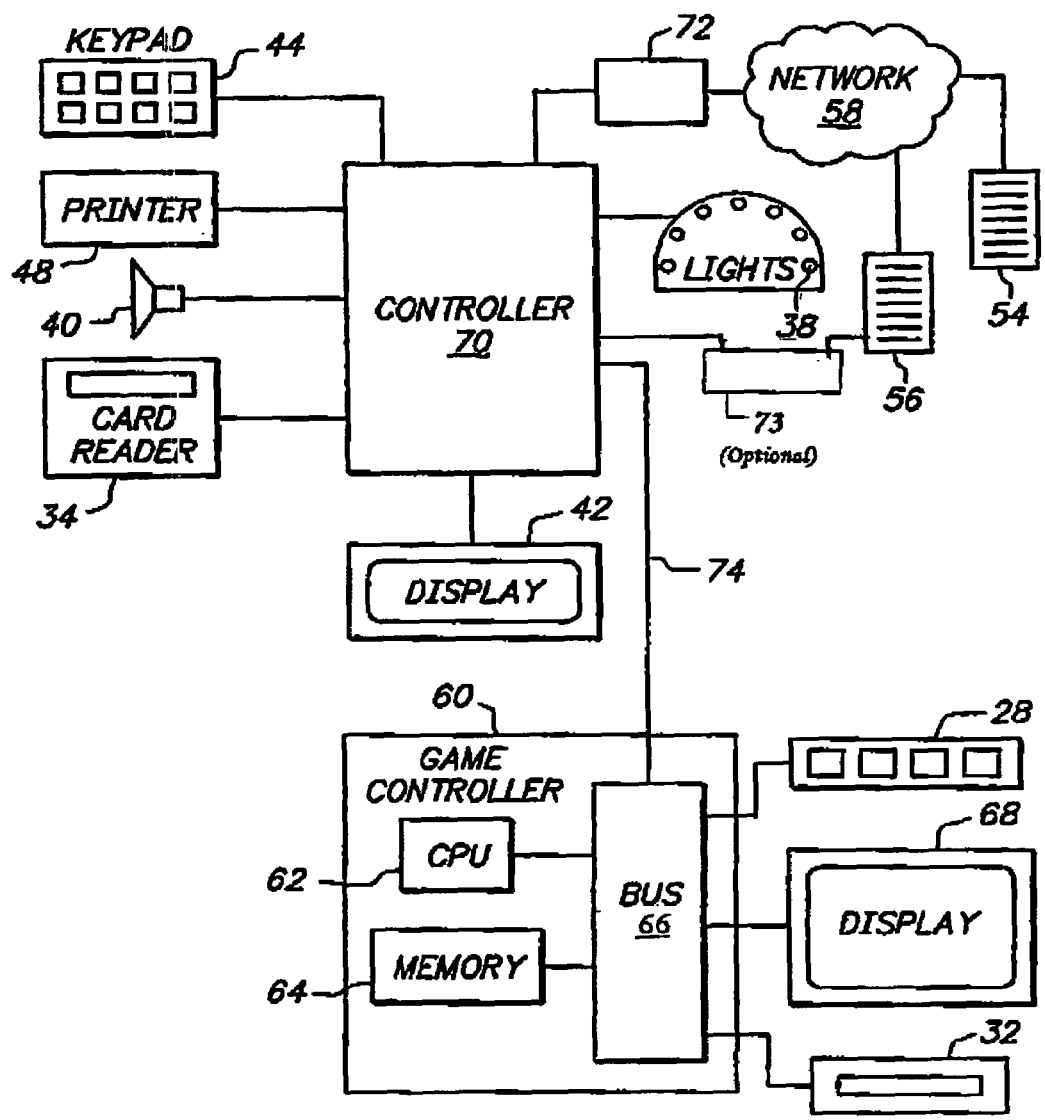
FIG. 2 is a schematic diagram of a gaming machine controller and player tracking controller of a gaming machine in accordance with the present invention.

Referring to FIG. 2, in a preferred embodiment of the invention, the gaming machine 20 includes a gaming machine controller 60. In general, the gaming machine controller 60 is arranged to control various aspects of the gaming machine 20, including for the purpose of presenting a game to a player of the gaming machine 20. The gaming machine controller 60 is preferably located within the housing 22 of the gaming machine 20.

In one embodiment, the gaming machine controller 60 includes a processing device or CPU 62 and a memory 64 associated with a bus 66. The memory 64 is arranged to store information, such as game software/code for execution by the processing device 62. The processing device 62 outputs instructions/data through the bus 66 for controlling one or more peripheral devices of the gaming machine for presenting the game. As illustrated, the peripheral devices may include a display 68. In the case of a slot game, the display 68 may comprise one or more reels. In the case of video poker and other gaming machines in which video information is displayed, the display 68 may comprise a CRT, LCD or the like. Other peripherals may include the above-referenced keys or buttons 28 for accepting user input, the coin acceptor 30 or the bill validator 32.

Machine readable code is stored at the memory 64 of the gaming machine controller 60. This code may be in a variety of languages and be of a variety of types. The code is executed by the CPU 62. The code may pertain to various aspects of the control of the gaming machine 20, such as the presentation of video information on the display 68, currency confirmation utilizing the bill acceptor 32 or the like. This code may be referred to as control code, game code or by other names related to the general function to be accomplished using the code.

In a preferred embodiment of the invention, the gaming machine 20 includes a secondary control system or device. In one embodiment, the secondary device is a player tracking device which is associated with a player tracking system. The player tracking device may have a wide variety of configurations.

The player tracking device is preferably housed within the gaming machine 20 or an associated structure. For example, the player tracking device may be located within the housing 22 of the gaming machine 20. In another embodiment, as illustrated in FIG. 1, the player tracking device is associated with a top box 36 which is located at the top of the gaming machine 20. The top box 36 may have a variety of shapes and sizes. Generally, the top box 36 defines an interior space in which one or more components are located.

The player tracking device may include a variety of components or elements. Preferably, the player tracking device includes at least one input device for accepting information from a player, and at least one output device for providing information to a player.

In one embodiment, the output device includes a plurality of lights 38 for visual stimulation, at least one speaker 40 for generating audible information, and a video display 42. In the embodiment illustrated, these elements may be associated with, such as by location within or connection to, the top box 36. The lights 38 may be of a plurality of types and be arranged to display in various colors. The display 42 may comprise a CRT type display, or an LCD/LED display or the like.

The input of the player tracking device of the gaming machine 20 may comprise a card reader 34 for reading information associated with a player card. The player card may comprise a plastic card including a magnetic stripe. In that arrangement, the card reader may comprise a magnetic stripe reader. The player card may comprise a number of other devices, such as a smart card including a chip.

The player tracking device of the gaming machine 20 also preferably includes a keyboard or keypad 44 which permits input from a player. The keypad 44 is preferably associated with a player tracking function, such as for inputting a player identification or personal identification number (PIN).

The gaming machine player tracking device may have a variety of other configurations and include the other devices. For example, the player tracking device may be fully integrated into the gaming machine 20 and not include a separate top box.

The player tracking device associated with the gaming machine 20 preferably includes a control device. In general, the control device is adapted to execute instructions/perform tasks, and transmit information or data from the gaming machine 20 to a remote location. As part of the tasks, the control device is adapted to control one or more peripheral devices, such as the lights 38 and a printer 48. As detailed below, the tasks also preferably include receiving gaming machine control or game code from a remote location, and providing that code or data to the game controller 60.

In one embodiment, the control device comprises a controller in the form of a slot management interface board (SMIB) 70. The SMIB 70 may have a variety of forms and configurations. In one embodiment, the SMIB 70 comprises a circuit board having circuits configured to execute or implement a variety of instructions/tasks.

In one embodiment, the SMIB 70 is arranged to control or interface with one or more peripheral devices. In a preferred embodiment, these devices include the player tracking device display 42, the keypad 44, the card reader 34, the lights 38, the at least one speaker 40, and the printer 48. The SMIB 70 and the peripheral devices may be arranged to communicate using a variety of protocols, such as USB, serial or parallel.

In one embodiment, the SMIB 70 is housed in the top box 36 of the player tracking device associated with the gaming machine 20. The SMIB 70 may be located elsewhere, however.

Figure 3:
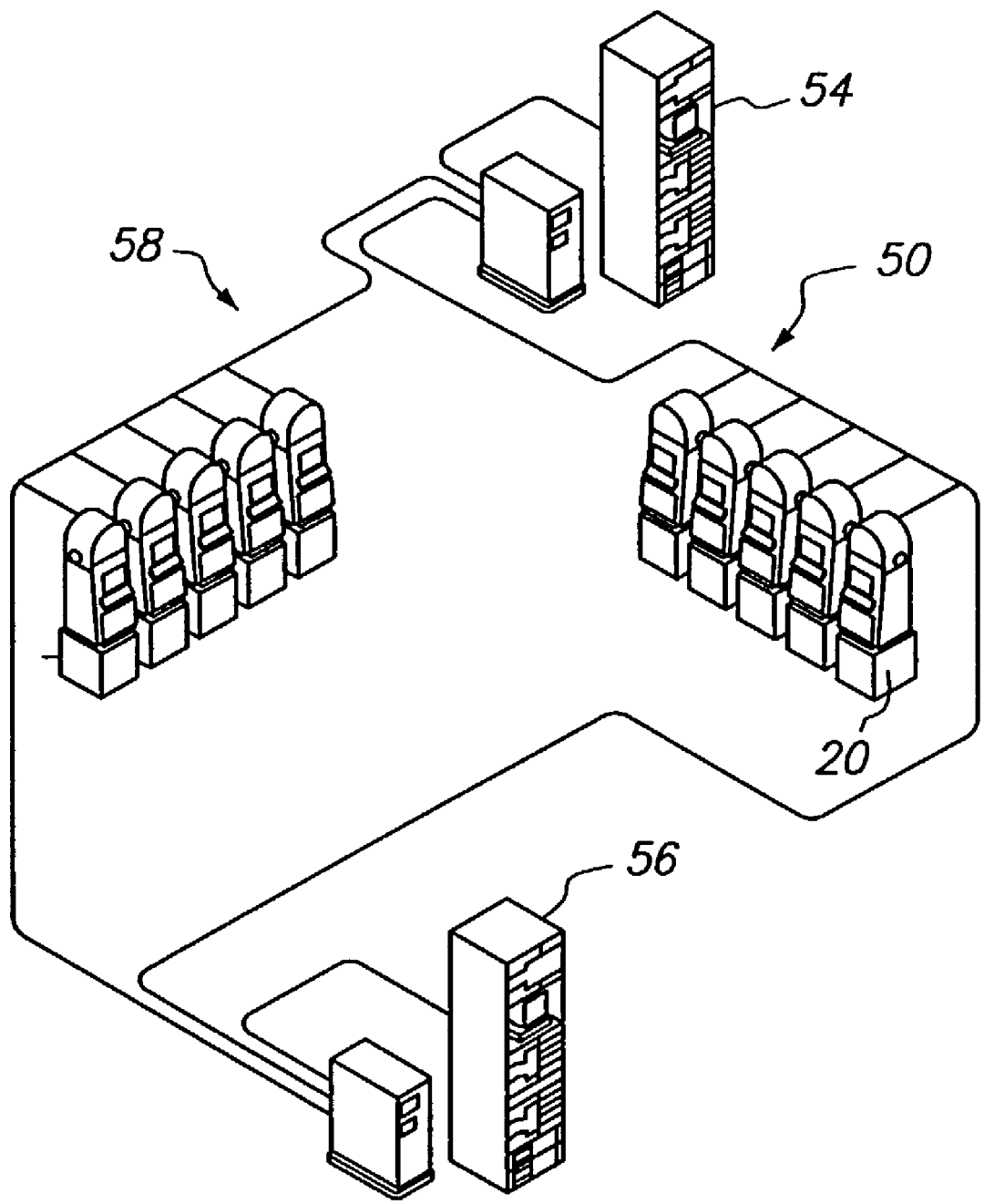
FIG. 3 illustrates a network including a plurality of gaming machines in accordance with an embodiment of a system of the invention.

One or more embodiments of the invention comprise a system for managing gaming machine code downloads. One embodiment of such a system 50 is illustrated in FIG. 3. In one embodiment, the system so includes at least one, and preferably a plurality of, gaming machines 20. In a preferred embodiment, the player tracking device of the gaming machine 20 is associated with one or more other devices through a wired or wireless communication network 58 including at least one communication link. In one embodiment, the system 50 includes at least one player tracking or reward system host 54. The player tracking or reward system host 54 is in communication with the player tracking device of the gaming machine 20 via the at least one communication link of the network 58.

The player tracking host 54 may comprise a single computer or a group of computers associated with one another on the network 58. Appropriate hardware and/or software is provided for permitting the one or more computing devices of the player tracking host 54 to send and receive information. For example, in one embodiment, data may be sent to and from the player tracking host 54 in accordance with any number of protocols, such as TCP/IP, Ethernet, IEEE-1394, Bluetooth and others. Appropriate hardware and software is provided for implementing these protocols. Of course, the communication protocol and the form of the network 58 are chosen in tandem. For example, the Bluetooth protocol may be implemented with a wireless network 58 including wireless data relay stations. An IEEE-1394 protocol may be implemented over a wired network, such as copper wire or fiber optic lines.

In one embodiment, the player tracking host 54 includes at least one data storage element for storing the player information. The data storage element may comprise a hard drive, RAM, tape drive, CD-ROM, DVD-RAM or other memory or data storage member or element. The player tracking host 54 may include a number of other devices, such as one or more displays, keyboards and other devices for displaying data, controlling operation thereof and the like.

In one embodiment, the player tracking host 54 is adapted to implement a player tracking/reward or "comp" function. The player tracking host 54 may thus be adapted to aggregate game play data regarding various players playing the gaming machines 20. This data may include information such as the length of time of game play, amounts bet, amounts awarded, and a wide variety of other information. In general, the player tracking device of each gaming machine 20 is adapted to transmit the player tracking data over the communications link(s) to the player tracking host 54. Based on player activities, a player may be awarded a "comp". Comps are generally awards, such as prizes, money, free game play, lodging or the like which are provided to the player apart from any awards which the player receives from direct game play. Such are referred to as "comps" as they are "complimentary" and generally do not require specific obligation, such as an additional bet, in order to be received. The system is often referred to as a reward or loyalty system because a player is generally awarded an award resulting from an extended or frequent game play. In one arrangement, a player may acquire points based upon a game criteria, such as amounts bet, won or lost. If a player accrues sufficient credits, the player is awarded a reward.

As illustrated in FIG. 2, a communication interface 72 is provided between the SMIB 70 and the player tracking system network 58. The communication interface 72 may comprise a wide variety of devices. For example, the communication interface 72 may comprise a modem or a PC type card including an antennae for implementing a wireless communication protocol such as Bluetooth. The communication interface 72 may comprise a PC type card facilitating a protocol over a wired network, such as Ethernet or Firewire®.

Player tracking information is transmitted via the SMIB 70 to the player tracking host 54. In one embodiment, data is transmitted from the SMIB 70 to the network 58 via the communication interface 72. This data is routed to the player tracking host 54.

In one embodiment, the information which is transmitted may comprise game play information regarding a player's game play activity. This information may include coins (or other monetary amounts credited), coins paid out, and time of play.

In a preferred embodiment, a communication link is also provided between a gaming code host 56 and the SMIB 70. In one embodiment, the gaming code host 56 is associated with the player tracking system network 58 and the communication link is provided by the network 58.

The gaming code host 56 may comprise a variety of devices. In one embodiment, the gaming code host 56 comprises a computing device configured as a server. In such a configuration, the gaming code host 56 may include at least one processor, at least one memory device, and at least one communication interface. The memory device may comprise a mass storage device for storing large amounts of data, such as an array of hard discs.

In one embodiment, the gaming code host 56 may comprise a portion of or be integrated with the player tracking host 54. In other words, a single computing device or group of computing devices may be configured to perform player tracking functions as detailed above and gaming code storage and dissemination, as detailed below.

Preferably, the game code host 56 stores executable code or other data or information for use by the gaming machine controller 60. This code may comprise, for example, game code or other control code for use by the gaming machine controller, such as for use in controlling the various peripheral devices of the gaming machine 20. The code may be stored in a variety of forms. For example, the code may be encrypted, compressed, and comprise compiled or uncompiled data.

In accordance with a method of the invention, as described in more detail below, code may be transmitted from the game code host 56 to the gaming machine 20 for use by the gaming machine controller 60 of the gaming machine 20 in operating the gaming machine, including presenting one or more games. In a preferred embodiment, code is transmitted from the game code host 56 to the SMIB 70 of the gaming machine 20, and then some or all of the code in modified or unmodified form is provided by the SMIB 70 to the gaming machine controller 60.

As illustrated in FIG. 2, in a preferred embodiment, a communication link 74 is provided between the gaming machine controller 60 and the SMIB 70. The communication link 74 permits data to be transmitted from the SMIB 70 to the gaming machine controller 60, and from the gaming machine controller 60 to the SMIB 70.

In a preferred embodiment, the communication link 74 operates by a proprietary protocol which permits only limited interaction between the SMIB 70 and gaming machine controller 60. This proprietary protocol is preferably different than the communication protocol by which the SMIB 70 transmits information to and receives information from the network 58, including the player tracking host 54 and game code host 56. In this manner, attempts to tamper with the gaming machine controller 60 via access through the network 58 and SMIB 70 are prevented. This ensures the security of the gaming machine controller 60.

In accordance with one embodiment of the invention there is a method of managing or controlling the download of code or other information from a remote location to a gaming machine. In one embodiment, the method is implemented via a gaming system including a game code server 56, network 58, and at least one gaming machine 20 as described above.

In one embodiment of method, in a first step S1, gaming machine code is provided to a device remote from the gaming machine. As described above, this remote device may comprise a game code server 56. The gaming machine code may be provided to the game code server 56 or other device in a variety of manners. For example, the code may be generated at the game code server 56. The code may also be generated remotely and be transferred to the server, such as through a network communication link or a removable media such as CD-ROM, removable disk or the like.

As indicated above, the code may be in a variety of forms and may be configured for a variety of purposes. For example, the code may be in a variety of languages. The code may also be configured for use by a gaming controller in presenting a game or specifically controlling a particular peripheral device of the gaming machine. As indicated, the code is preferably machine readable code. The code may comprise data or other information, as is known in the use of computing devices.

In a second step S2 of the method, the code is transferred from the remote device, such as the game code server 56, to a portion of the gaming machine 20 other than the gaming machine controller 60. As indicated above, this other portion of the gaming machine 20 preferably comprises a secondary device. By "secondary device," it is meant a device other than the device which is primarily intended to run or utilize the code or information. In one preferred embodiment, this secondary device comprises the player tracking controller or SMIB 70.

In one embodiment, the code may be transferred to the SMIB 70 or other device based on a variety of criteria or events. For example, in one embodiment, the trigger for the download may be effected at the game code server 56. As one example, a game operator may wish to update particular code associated with one or more gaming machines 20, such as bill validation code. The operator may cause new code to be transmitted from the game code server 56 to each gaming machine 20. For example, the operator may input a request to transmit code directly to the game code server 56 by a keyboard or other direct input device.

In another embodiment, a request for code may be transmitted from the gaming machine 20 to the game code server 56 for fulfillment. In one embodiment, the gaming machine controller 60 may generate such a request. For example, the gaming machine controller 60 may cause the display 68 to display a list of games which may be played at the gaming machine 20. A player may select a particular game from the list. In response to the selection, the gaming machine controller 60 may transmit a request to receive the gaming code necessary to present the selected game to the player. In a preferred embodiment, the request from the gaming machine controller 60 is transmitted to the SMIB 70 via the communication link 74, and then from the SMIB 70 to the game code server 56.

In another embodiment, the request may be generated by and transmitted from the SMIB 70. For example, a player may be permitted to select their favorite or "default" game. The default game is presented to the player at the gaming machine 20 whenever the player identifies themselves at the gaming machine 20. For example, a player may insert their player tracking card into the card reader 32. The player tracking card may include information regarding the player's preferred game. Alternatively, the player tracking card may include player identification information which the player tracking controller sends to the player tracking host 54. The player tracking host 54 may utilize the identification information to identify the player's preferred game. This information may be sent back to the SMIB 70 and then the SMIB 70 may transmit a request to the game code server 56 for game code for the player's game. Alternatively, the game information may be transmitted from the player tracking host 54 to the game code server 56 directly.

The game code may be transmitted to the SMIB 70 or other device of the gaming machine 20 in a variety of manners. In part, the manner by which the code is transmitted is dependent upon the communication protocol used.

Generally, however, the code will be transmitted in packetized form. Preferably, each data packet includes a destination address, such as in an address header. The packetized form of the transmission permits the code to be transmitted to a variety of different gaming machines 20 associated with the system 50 at generally the same time. Individual packets are reassembled at each gaming machine 20.

The code may be transmitted in whole or in part during a transmission event. For example, if a request is made for particular game code, the game code may be transmitted in portions or segments spaced over time, or be transmitted immediately. The manner by which code is transmitted may be determined by a variety of criteria. In one embodiment of the invention, the request for code may include an indication of the priority of the need for the code. For example, in the case of an upgrade of code, the code may be transmitted when sufficient bandwidth is detected as being available to permit the transmission without slowing current network activity, such as the transmission of player tracking data. In the case where a player is requesting to play a particular game, the request may be of a high priority. In this event, the code may be transmitted immediately, even though such may slow the speed at which other data is transmitted between the various gaming machines 20 and the other devices on the network 58.

In a step S3 of the method, the code is processed by the SMIB 70 or processing device of the secondary device, such as a processor of a player tracking controller. The processing may simply comprise a re-transmission of the code or data to the gaming machine controller 60. In other embodiments, the processing may comprise the compilation of code, assembly of data or the like. For example, in one embodiment where code is transmitted in portions over an extended period of time, the processing may comprise assembling the various portions of the code.

In a preferred embodiment, the code is received by the communications interface 72 and is routed to a memory of the SMIB 70. In one embodiment the code is stored at the memory of the SMIB 70 over a period of time, and in another embodiment the code is only stored until it has been processed and transmitted to the gaming machine controller 60. In one embodiment, the code may be stored until overwritten.

In a step S4 of a method, the processed code is provided to the gaming machine controller 60. In one embodiment this step comprises the transmission of the code over the communication link 74 from the SMIB 70 to the gaming machine controller 60.

In a preferred embodiment, the transmitted code is stored at the memory 64 of the gaming machine controller 60. The code may be stored in other locations.

Once the code is transmitted to the gaming machine controller 60, the code may be further processed. In a preferred embodiment the code is used, such as executed by the CPU 62, by the gaming machine controller 60.

The apparatus or system for implementing the methods of the invention may vary. As indicated, in one embodiment, the game code or other data is transmitted from the game code host 56 to the gaming machine 20 via the player tracking network 58. In embodiment, the game code host 56 in on or a part of this network. In another embodiment, the game code host 56 is associated with a different network, and the game code is transmitted from the game code host 56 via this network and the player tracking network 58 to reach the gaming machine 20.

In another embodiment, the game code host 56 may be arranged to transmit game code to the player tracking controller via a network or communication link entirely separate from the network 58 connecting the player tracking controller and the player tracking host 54. In this manner, a secure network link may be provided to the gaming machine over which gaming code is transmitted. For example, in one embodiment, the player tracking device of the gaming machine 20 may include a first communication interface 72 and a second communication interface 73. The first communication interface 72 connects the player tracking device to the network 58 (and thus the player tracking host 54), such as via a wired or wireless link. The second communication interface 73 connects the player tracking device to the game code host 56, such as via a wired or wireless link. In a preferred embodiment, the player tracking device is connected by a wired link to a wired network 58, and via a wireless link to the game code host 56 (or via a wireless link to a part of a network with which the game code host 56 is associated). In this configuration, a gaming machine 20 which is already wired to an existing wired player tracking network can be simply configured to implement the invention without the need to put into place another wired link, but still provide greater data bandwidth and a dedicated path, by utilizing a wireless link. In another embodiment, the player tracking device includes a single communication interface adapted to communicate with both communication links/networks.

Game code may be transmitted to a secondary device of the gaming machine other than the player tracking controller. For example, a processing unit/controller/communication interface element may be associated with the machine and have as its sole or primary purpose only serving as the interface for the download of control code to the gaming machine.

As indicated, in one embodiment the player tracking host 54 and game code host 56 are located remote from the gaming machine 20. By "remote," it is generally meant that these devices are not located within or at the gaming machine 20. Further, one or more gaming machines 20 which are located remote from one another may be associated with the same game code host 56. The one or more gaming machines 20 may be associated with different gaming properties or operators, or a variety of properties or locations operated by a single entity or different entities. In such an embodiment, the one or more communication links forming the network 58 may comprise phone lines or the link connecting the properties.

The system and method in accordance with the present invention has numerous advantages. As one aspect of the invention, a means is provided for providing gaming code or other data from a remote location to a gaming machine. This means provides the code to the gaming machine for use by the gaming machine controller in an indirect fashion.

A number of advantages are realized as a result of the indirect download of code to the gaming machine. One advantage is that resources of the gaming machine controller are not utilized to effect the download. As one example, a gaming machine controller may be storing and executing a particular set of gaming code at a time when the operator wishes to update the code for that game. In the arrangement of the invention, the updated code can be transmitted to the machine and be stored at the machine without interrupting the gaming machine controller. When play of the gaming machine ceases, then the code may be provided to the gaming machine controller for installation and use.

In a preferred embodiment, the player tracking controller or other secondary device to the gaming machine controller acts as the "queue" for downloaded code. Thus, while the gaming machine controller may be running a particular game, the code can be downloaded to the player tracking controller or other secondary device. It will be appreciated that the time necessary to download code from a remote device to the player tracking controller or other secondary device will generally be substantially greater, and generally greater in magnitudes, than the time needed to transmit the code from the player tracking controller or other secondary device to the gaming machine controller.

As one aspect of the invention, the "queuing" effect of the download has the advantage of improving network traffic. In many cases, particular code need not be immediately accessible to the gaming machine controller of a gaming machine. However, by necessity, without the queuing feature of the invention, the code must generally be sent as quickly as possible to avoid the gaming controller from being tied up in waiting for the code for installation. In accordance with the invention, during periods of high network traffic, only limited amounts of code may be downloaded to the player tracking controller or other secondary device of the gaming machine. During lower periods of network traffic the code may be downloaded at higher rates. Regardless of the speed of download, however, the player tracking controller is arranged to obtain and store, including assembling this code. When the entirety of the code is downloaded, the code can be immediately provided to the gaming machine controller.

As another aspect of the invention, a request for code or to provide code may include priority information. This priority information can be used to match the need for code at a particular time or speed with the available network bandwidth. Thus, only code immediately required is immediately transmitted, while other code may be transmitted only when the network bandwidth is greater, as discussed above.

In accordance with the invention, greater amounts of code are immediately available to the gaming machine controller. For example, the gaming machine controller may have game code for a first game loaded into its memory. The player tracking controller or other secondary device may store game code for a second game. In the event a desire exists to present the second game, the code is already available to the gaming machine controller on an immediate basis. As one aspect of this feature, this allows the gaming machine controller to have less memory. This may allow, for example, the gaming machine controller to include only higher speed access memory, such as RAM, instead of a hard drive, since less code needs to be stored by the gaming machine controller. This is because the gaming machine controller still has ready access to other code necessary to present other games or to control the gaming machine via the player tracking controller or other secondary device memory.

Yet another advantage of the invention is that in some instances, older gaming machines may not be provided with a network link to their gaming machine controllers. These gaming machines may have been retrofitted with a separate player tracking device associated with a player tracking network or system. In accordance with the invention, gaming code can now be provided to the gaming machine controller using the existing player tracking network, avoiding the need for another network or communications link.

It will be understood that the above described arrangements of apparatus and the method therefrom are merely illustrative of applications of the principles of this invention and many other embodiments and modifications may be made without departing from the spirit and scope of the invention as defined in the claims.

I claim:

1. A system for providing a gaming machine with machine readable code from at least one remote location comprising:
at least one gaming machine, said gaming machine comprising:
a gaming machine controller adapted to control a game of chance played on the gaming machine by executing the machine readable game code,
a first memory for storing the machine readable game code executed by the gaming machine controller;
a display for presenting the game of chance;
a player tracking device, coupled to the gaming machine and operable to communicate with the gaming controller, a player tracking host and a game code host,
a player tracking controller, separate from the gaming machine controller, adapted for a) controlling one or more peripheral devices coupled to the player tracking device, b) downloading first machine readable game code to the player tracking device from the same code host wherein the first machine readable game code is not intended for execution by the player tracking controller or for execution by the one or more peripheral devices and c) transmitting the first machine readable game code to the gaming machine controller wherein the gaming machine is operable to replace a first instance of the game of chance played on the gaming machine with a second instance of the game of chance played on the gaming machine by executing the first machine readable code;
a first peripheral device adapted to receive first player tracking information;
a second peripheral device adapted to display second player tracking information;
a first communication interface associated with said player tracking device adapted to permit said player tracking device to receive the first machine readable game code that is for execution by the gaming machine controller from the game code host and to communicate with the player tracking host;
a second memory for storing at least a portion of the first machine readable game code received from the game code host;
a third memory for storing machine readable player tracking code executed by the player tracking controller;
a second communication interface adapted to allow transmission of information between the gaming machine controller and the player tracking device wherein the player tracking device is configured to transmit over the second communication interface the first machine readable game code to the gaming machine controller the player tracking host arranged to store data regarding activities of one or more players of said gaming machine and to communicate with the player tracking device via the first communication interface;
the game code host adapted to store the first machine readable game code and to transmit the first machine readable game code to the player tracking device;
a communication network adapted to allow communication between the player tracking host, the game code host and the player tracking device.

2. The system in accordance with claim 1 wherein at least a portion of the communication network includes a wireless communication link.

3. The system in accordance with claim 1 wherein the one or more peripheral devices includes a card reader.

4. The system in accordance with claim 1 wherein said player tracking host and said game code host comprise a common device.

5. The system in accordance with claim 1 wherein said player tracking device comprises a self-contained element connected to said gaming machine.

6. The system of claim 1, wherein the player tracking device is operable to store the portion of the first machine readable game code to the second memory while the gaming machine is executing the machine readable game code.

7. A method of providing a game of chance on a gaming machine comprising a) a gaming machine controller adapted to control the game of chance played on the gaming machine and b) a player tracking device including a player tracking controller coupled to the gaming machine adapted to communicate player tracking data to a player tracking host under the control of the player tracking controller, the method comprising:
storing machine readable game code to a first memory on the gaming machine;
generating, under control of the game machine controller, the game of chance by executing the machine readable game code;
storing machine readable player tracking code to a third memory on the player tracking device;
providing, under control of the player tracking controller, player tracking services by executing the machine readable player tracking code;
receiving, under control of the player controller, first machine readable game code from a remote device wherein the first machine readable game code is not intended for execution by the player tracking controller;
storing, under control of the player controller, at least a portion of first machine readable game code to a third memory on the player tracking device;
transmitting the first machine readable game code to the gaming machine controller wherein the gaming machine is operable to replace a first instance of the game of chance played on the gaming machine with a second instance of the game of chance played on the gaming machine by executing the first machine readable code;
executing, under control of the gaming machine controller, the first machine readable game code to generate the game of chance played on the gaming machine; and
communicating, under control of the player tracking controller, the player tracking data including amounts bet to the player tracking host.

8. The method in accordance with claim 7 further comprising generating a request for the first machine readable code at said gaming machine and including the step of transmitting said request from said gaming machine to said remote device.

9. The method in accordance with claim 8 comprising generating said request at said player tracking controller of said gaming machine.

10. The method in accordance with claim 8 comprising generating said request in response to a player providing player identification information to said player tracking controller.

11. The method in accordance with claim 10 wherein said providing step comprises reading a player tracking card at a card reader associated with said player tracking controller.

12. The method in accordance with claim 7 comprising transmitting said first machine readable game code over at least a portion of a network with which said gaming machine and the player tracking host are associated.

13. The method in accordance with claim 7 further comprising receiving the first machine readable game code in portions wherein the portions are received at different times and assembling the portions of the first machine readable game code.

14. The method in accordance with claim 7 further comprising generating a request for the first machine readable code at said gaming machine wherein said request includes priority information regarding a time for transmitting said first machine readable game code to the player tracking device.

15. The method in accordance with claim 7 further comprising, under control of the player tracking controller, compiling the first machine readable game code prior to transmitting the first machine readable game code to the gaming machine controller.

16. The method of claim 7, wherein the first machine readable game code is received under control of the player tracking controller from the remote device while the gaming machine is generating the game of chance by executing the machine readable game code.

17. A gaming machine for providing wagering on a game of chance, said gaming machine comprising:
a gaming machine controller adapted to control the game of chance played on the gaming machine by executing machine readable game code,
a first memory for storing the machine readable game code executed by the gaming machine controller;
a display for presenting the game of chance;
a player tracking device operable to communicate with the gaming controller a player tracking host and a game code host,
a player tracking controller, separate from the gaming machine controller, adapted for a) controlling one or more peripheral devices coupled to the player tracking device, b) downloading first machine readable game code to the player tracking device from the game code host wherein the first machine readable game code is not intended for execution by the player tracking controller or for execution by the one or more peripheral devices and c) transmitting the first machine readable game code to the gaming machine controller wherein the gaming machine is operable to replace a first instance of the game of chance played on the gaming machine with a second instance of the game of chance played on the gaming machine by executing the first machine readable code;
a first peripheral device adapted to receive first player tracking information;
a second peripheral device adapted to display second player tracking information;
a first communication interface associated with said player tracking device adapted to permit said player tracking device to receive the first machine readable game code that is for execution by the gaming machine controller from the game code host and to communicate with the player tracking host;

a second communication interface adapted to allow transmission of information between the gaming machine controller and the player tracking device wherein the player tacking device is configured to transmit over the second communication interface the first machine readable game code to the gaming machine controller;

a second memory for storing at least a portion of the first machine readable game code received from the game code host; and a third memory for storing machine readable player tracking code executed by the player tracking controller.

18. The gaming machine of claim 17, wherein said player tracking host and said game code host comprise a common device.

19. The gaming machine of claim 17, wherein the player tracking controller is further adapted for compiling the first machine readable game code prior to transmitting the first machine readable game code to the gaming machine controller.

20. The gaming machine of claim 17, wherein to player tracking controller is further adapted for receiving to first machine readable game code in portions wherein the portions are received at different times and assembling the portions of first machine readable game code.

21. The gaming machine of claim 17, wherein the player tracking controller is further adapted for determining a status of the gaming machine controller and scheduling the transmission of the first machine readable game code to the gaming machine controller in response to the determined status of the gaming machine controller.

22. The gaming machine of claim 17, wherein the player tracking device is operable to store the portion of the first machine readable game code to the second memory while the gaming machine is executing the machine readable game code.

23. A player tracking device operable to communicate with a gaming controller on a gaming machine, a player tracking host and a game code host, said player tracking device comprising:

one or more mounting mechanisms for coupling the player tracking device to the gaming machine;

a player tracking controller, separate from the gaming machine controller, adapted for a) controlling one or more peripheral devices coupled to the player tracking device, b) downloading first machine readable game code to the player tracking device from the game code host wherein the first machine readable game code is not intended for execution by the player tracking controller or for execution by the one or more peripheral devices, c) transmitting the first machine readable game code to the gaming machine controller wherein the gaming machine is operable to replace a first instance of the game of chance played on the gaming machine with a second instance of the game of chance played on the gaining machine by executing the first machine readable code, d) receiving player tracking data from the gaining machine controller and e) sending the player tracking data to the player tracking host;

a first peripheral device adapted to receive first player tracking information;

a second peripheral device adapted to display second player tracking information;

a first communication interface associated with said player tracking device adapted to permit said player tracking device to receive the first machine readable game code that is for execution by the gaming machine controller from the game code host and to communicate with the player tracking host;

a second communication interface adapted to allow transmission of information between the gaming machine controller and the player tracking device wherein the player tracking device is configured to transmit over the second communication interface the first machine readable game code to the gaming machine controller a first memory for storing at least a portion of the first machine readable game code received from the game code host;

a second memory for storing machine readable player tracking code executed by the player tracking controller.

24. The player tracking device of claim 23, wherein said player tracking host and said game code host comprise a common device.

25. The player tracking device of claim 23, wherein the player tracking controller is further adapted for compiling the first machine readable game code prior to transmitting the first machine readable game code to the gaming machine controller.

26. The player tracking device of claim 23, wherein the player tracking controller is further adapted for receiving the first machine readable game code in portions wherein the portions are received at different times and assembling the portions of first machine readable game code.

27. The player tracking device of claim 23, wherein the player tracking controller is further adapted for determining a status of the gaming machine controller and scheduling the transmission of the first machine readable game code to the gaming machine controller in response to the determined status of the gaming machine controller.

28. The player tracking device of claim 23, wherein the player tracking device is operable to download the portion of the first machine readable game code to the second memory while receiving player tracking data generated from the gaming machine controller.

* * * * *